United States Patent Office 2,781,349
Patented Feb. 12, 1957

2,781,349

CERTAIN SALTS OF 2-HYDROCARBON IMIDAZO-LINIUM DI-ALKANOIC ACID SALTS OF DETERGENT SULFONIC ACIDS OR SULFATE ACIDS

Hans S. Mannheimer, New York, N. Y.

No Drawing. Application April 2, 1956,
Serial No. 575,300

2 Claims. (Cl. 260—309.6)

This invention relates to novel compositions and to methods for producing them. In one of its more specific aspects, the invention is directed to novel derivatives of certain surface active agents which behave anionically at pH above 7, and which I shall hereinafter refer to as "surface active agents behaving anionically at pH above 7."

Said "surface active agents behaving anionically at pH above 7" have been found useful as detergent, foaming, wetting, emulgating, emulsifying and dispersing agents. They are surface active agents, and serve as excellent synthetic detergents, dye assistants and softeners in the textile and related fields.

Said "surface acting agents behaving anionically at pH above 7," employed as starting materials in the practice of this invention, are amphoteric surface active agents of the following general Formula IA:

FORMULA IA

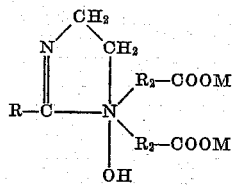

in which R is a hydrocarbon radical of 4–18 carbon atoms; each $R_2$ is an hydrocarbon group of 1–4 carbon atoms; and M is an alkali metal.

Said compounds of Formula IA may be produced in a number of different ways:

For example, 1 mole of a diamine, such as ethylene diamine ($NH_2C_2H_4NH_2$) may be reacted with 1 mole of a monocarboxylic acid, R—COOH, examples of which are set forth in my U. S. Patent 2,528,378. The reaction may be continued under the conditions set forth in Example 9 of said patent until 2 moles of water have been formed to provide a compound

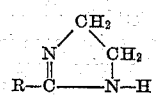

1 mole of said last identified compound may be reacted with 2 moles of one of monohalomonocarboxylic acids of 1–4 carbon atoms in their radicals attached to the COOH groups thereof, together with about 4.5–5 moles of an alkali metal hydroxide to provide compounds of Formula IA:

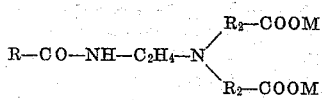

The following are specific illustrative examples of some of the starting materials of Formula IA and the method for preparing them, all parts being given by weight unless otherwise specified:

Example A

1 mole of lauric fatty acid ($C_{11}H_{23}COOH$) and 1 mole of ethylenediamine ($NH_2C_2H_4NH_2$) are added together and then heated in the presence of an inert solvent such as toluol in amounts sufficient to dissolve the same. This solution is maintained at a temperature of approximately 110° C. This heating is carried out under a condenser through which pass vapors which consist of some of the solvent and water of reaction as well as small amounts of unreacted amine. These products are caught in a collector from which the water of reaction is removed and the condensed toluol and collected amine are returned to the reacting vessel. The temperature of the mass is maintained at 110° C. under the aforesaid conditions until 0.9 mole of water is collected. Then the toluol and 0.1 additional mole of water are removed under heat and high vacuum. The resultant mass is essentially:

$C_{11}H_{23}CONHC_2H_4NH_2$

Then a vacuum of approximately 30 mm. of mercury is applied to the reacting vessel and the temperature gradually raised to about 230° C. over a two-hour period until all of the solvent and an additional mol of water have been removed. The resulting product is lauric cycloimidine and to all of said product is added 2 moles of monochloracetic acid and this mixture is heated to a temperature of approximately 120° C. whereupon the temperature of the mass will spontaneously rise to 170° C. By the application of external heat the mass is maintained at said temperature at approximately 170° C. until a one part sample thereof when dissolved in 100 parts of aqueous solution of sodium hydroxide having a pH of approximately 9 provides a clear solution. 1 mole of this cycloimidic acid so produced is added to an aqueous solution containing 4 moles of sodium hydroxide. The entire mass is heated to approximately 80° C. whereupon there is formed the following compound hereinafter known as product IA–1:

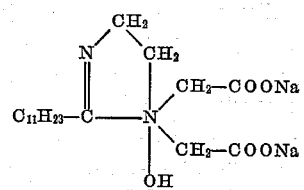

product IA–1 may be produced in still another way which I prefer. Instead of adding the monochloracetic acid at the stage previously shown, there first may be prepared an aqueous solution containing 4 moles of sodium hydroxide and 2 moles of monochloracetic acid. The temperature of this solution is reduced below 15° C. and preferably 5 to 10° C. and while maintained at said reduced temperature and being constantly agitated there is added thereto one mol of the lauric cycloimidine. While being constantly agitated the temperature of the mass is raised over a one-hour period to about 95° C. Then the temperature of this constantly agitated mass is maintained at 95° C. for an additional 3 hours or until a sample thereof in 100 parts of water will be clear and the pH is no longer subject to change on further heating of the mass at that temperature.

Prior to this invention, it was known that cationic surface active agents and anionic surface active agents when together in aqueous solution resulted in the production or formation of water insoluble compounds, and that adding an anionic surface active agent to an aqueous solution of another anionic surface active agent resulted in a mere physical combination of said agents and that no reaction would occur between them.

Said compounds of Formula IA normally behave anionically in aqueous solutions having a pH above 7, and consequently it was expected that when in aqueous solution together with anionic surface agents that they would be combined physically only and that no chemical reaction would occur therebetween. In the course of my experimentations, I have discovered that they could be reacted with certain anionic surface active agents at a pH above 7 to produce water-soluble reaction products. Not only did I make said discovery, but I further discovered that water solutions of such reaction products had viscosities greater than corresponding aqueous solutions of compounds of Formula IA, and also exhibited better foaming characteristics than did said compounds in very low dilutions under extreme water hardness conditions. Said reaction products are non-toxic and non-irritating to the human skin. They have been found eminently useful as general utility detergents, such as for car washing, dish washing, clothes washing, etc. Said compounds of Formula IA and compounds of Formulas IIA–IID when, any one of them alone or a combination of two or more of them in mere physical mixture are used as components of shampoos caused varying degrees of irritation and marked stinging of the eyes when such shampoos were used and water solutions thereof accidentally reached the eyes. I have further discovered that the reaction products of this invention caused practically no irritation or stinging of the eyes when so employed.

According to this invention, one or a combination of two or more of compounds of the general structural Formula IA are reacted with one or a combination of two or more anionic surface active agents of the following general structural Formulas IIA–IID which are broadly referred to as Formula II, to provide novel, water-soluble compounds having the following general structural Formula III, which are broadly referred to as Formula III, all having high wetting, detergency and surface active properties and capable of providing voluminous and stablefoams in aqueous solutions, and which solutions are substantially non-irritating to the skin and eyes of normal human beings.

Compounds of Formulas IIA–IID respectively are detergent sulfonic acid salts and sulfate salts which may be represented as follows:

G—M wherein M has heretofore been defined and G is selected from the group consisting of:

$$R-CO-N(R_g)-R_h-X$$
$$R_f-Z-(C_2H_4O)_x-SO_3$$
$$R_f-X$$
$$R_f-COO-R_k-X$$

Compounds of Formula III may be represented as follows:

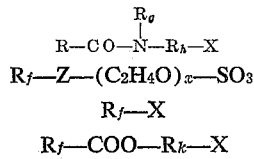

wherein $R_f$ is selected from the class consisting of aliphatic hydrocarbon radicals of 6–20 carbon atoms and aliphatic-aromatic hydrocarbon radicals with a maximum of 20 carbon atoms and having at least 6 carbon atoms in the aliphatic portions thereof; $R_g$ is selected from the class consisting of ($a$–1) hydrogen, ($a$–2) aliphatic hydrocarbon radicals of 1–8 carbon atoms, ($a$–3) hydroxy substituted aliphatic hydrocarbon radicals of 1–8 carbon atoms, ($a$–4) aliphatic ether radicals, each having at least one ether linkage therein and otherwise being hydrocarbon of 2–8 carbon atoms, ($a$–5) aliphatic ether radicals, each of said radicals having at least one ether linkage therein and otherwise being hydroxy substituted hydrocarbon of 2–8 carbon atoms; $R_h$ is selected from the group consisting of ($b$–1) unsubstituted and hydroxy substituted aliphatic, aromatic and aromatic-aliphatic hydrocarbon groups of 1–12 carbon atoms, ($b$–2) aliphatic keto groups, each of said groups having at least one keto linkage therein and otherwise selected from the class consisting of hydrocarbon and hydroxy substituted hydrocarbon of 2–12 carbon atoms, ($b$–3) aliphatic ether groups, each of said groups having at least one ether linkage therein and otherwise being hydrocarbon of 2–12 carbon atoms, ($b$–4) aliphatic ether groups, each of said groups having at least one ether linkage therein and otherwise being hydroxy substituted hydrocarbon of 2–12 carbon atoms, ($b$–5) aliphatic groups having a CONH linkage therein and otherwise being hydrocarbon of 2–12 carbon atoms; $R_k$ is selected from the group consisting of unsubstituted and hydroxy substituted aliphatic hydrocarbon groups of 1–12 carbon atoms, said ($b$–2) to said ($b$–5); Z is selected from the group consisting of oxygen and sulphur; $x$ is 1–5; X is selected from the group consisting of $SO_3$ and $OSO_3$; and M is an alkali metal.

According to this invention, I react a compound of Formula IA with a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent, has been added to lower the pH of the solution to a value of approximately 7 to approximately 9 and while maintaining the mass at a temperature between approximately 100–200° F. In this reaction under the aforesaid conditions, the compounds of Formula III are produced, said compounds having high water solubility. Such compounds of Formula III have an unexpected extremely high water-solubility, while the corresponding salts of cationic compounds are water-insoluble. The resultant aqueous solution can be used directly as a surface active agent, wetting agent or detergent for the purposes indicated for the compounds of Formula IA. While the quantities of the compound of Formula IA and compound of Formula II may be equimolecular for good yield of compounds of Formula III, I may employ an excess of either, and in general the mole ratio of a compound of Formula I to compound of Formula II may be 2 moles of the former to 1–3 moles of the latter.

One of the specific methods which I prefer to employ in carrying out an aspect of this invention is to first dissolve a compound of Formula IA in water and then the pH thereof is adjusted to approximately 12–13 (measured electrically) by the addition of aqueous caustic soda if required so that when a compound of Formula II is added thereto, the pH of the solution of IA and II will be at least 10 and generally 10.5–11. The temperature of said solution is raised to 100–200° F. and preferably in factory practice to approximately 140° F. Then a quantity of a compound of Formula II is dissolved in water in a separate container and this solution is added to said first solution and the mass is maintained in said temperature range while being constantly stirred, and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

*Example 1*

An aqueous solution of 400 parts of product IA–1 in 600 parts of water is heated to approximately 140° F. and its pH adjusted to 12–13 (measured electrically) by the addition of caustic soda. While being constantly stirred and maintained at that temperature there is added a solution of 375 parts of sodium salt of lauroyl diethanolamide sulfate:

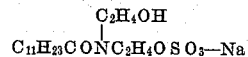

in 500 parts of water. Then while stirring and temperature is maintained, there is added thereto between about 30–40 parts of hydrochloric acid solution (32%) whereby the pH of the mass is lowered to a value in the range of 8.2 to 8.7. Stirring is continued and the temperature is maintained for about 10 minutes more. The resultant product is a solution of the novel reaction product of the following formula:

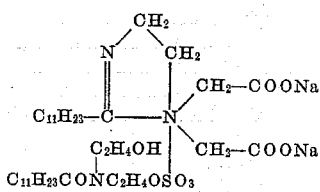

Example 2

Employ the same procedure and components as set forth in Example 1, except that only 200 parts of the salt of the sulfate are employed. In this instance, the resultant product is a solution of the novel reaction product of Example 1 together with unreacted product IA-1 used in the approximate proportion of 2 to 1.

Employ the same procedure as that set forth in Example 1, but employ the components set forth in the following examples, the quantity of hydrochloric acid solution (32%) is variable to lower the pH to the values indicated to obtain the novel reaction products of said examples.

Example 3

400 parts of product IA-1 in 600 parts of water. 300 parts of

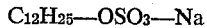

in 450 parts of water.

FORMULA OF NOVEL REACTION PRODUCT

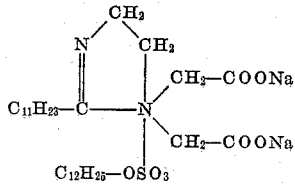

Example 4

400 parts of product 1A-1 in 600 parts of water. 310 parts of

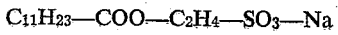

in 450 parts of water.

FORMULA OF NOVEL REACTION PRODUCT

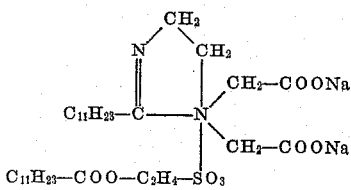

Examples 5 on

Employing 1 mole proportion of all of the other specific compounds of Formula IA respectively in about one and one-half times its weight of water and 1 mole proportion of any of the specific Formulas IIA–IID respectively in one and one-half times its weight of water, there are produced literally hundreds of compounds of Formula III which differ from those of Examples 1–4 and such compounds are also specific examples of illustrative novel reaction products of this invention. Other Examples of Formulas IIA–IID are:

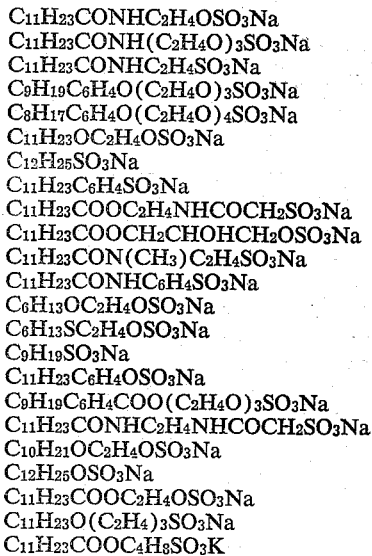

It is also to be understood that any of the specific products of the IA series which are shown herein merely as illustrative examples of the starting materials of Formula IA which may be reacted with any of the specific sulfate or sulfonate salts which are shown herein merely as illustrative examples of reactants of Formula II to produce novel compounds of Formula III.

It is to be understood that, as to compounds of Formulas IIA, IIC and IID and also as to novel reaction products thereof when either $SO_3$ or $OSO_3$ is used in the specifications or claims, it is meant to indicate either one or the other because of their obvious equivalency; it is also to be understood that the use of Na in the specification and claims is meant to indicate any of the other alkali metals because of their obvious equivalency; and it is also to be understood that the CONH linkage when part of compounds in the specification and claims is meant to indicate either it or NHCO because of their obvious equivalency.

It is also to be understood that instead of first adjusting the pH of the compound of Formula IA to 12–13 before the addition of the compound of Formula II, any other method may be employed to obtain the condition whereby the pH of the solution of IA and II is at least 10 and preferably 10.5–11 before the addition of the acidic agent to lower the pH of the mass to approximately 7 to approximately 9. For example, IA and II may be dissolved together and this solution may by the addition of caustic soda when required have its pH adjusted to at least 10, and then at 100°–200° F. is ready for the addition of the acidic agent to lower its pH to approximately 7 to approximately 9.

This application is a continuation-in-part of my co-pending applications: Ser. Nos. 413,721, filed March 2, 1954, now abandoned; 425,307, filed April 23, 1954, now abandoned; 473,043, filed December 3, 1954; 481,703, filed January 13, 1955, now abandoned; 521,393, filed July 11, 1955, now Patent No. 2,773,068; and 565,538, filed February 15, 1956, now abandoned.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

I claim:

1. A compound selected from the class consisting of salts of detergent sulfonic acids and detergent sulfates respectively and an amphoteric surface active agent, said compound having the following formula:

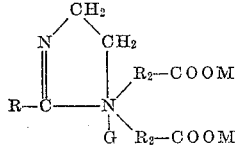

in which R is a hydrocarbon radical of 4–18 carbon atoms, and each $R_2$ is aliphatic hydrocarbon of 1–4 carbon atoms, and G is selected from the class consisting of sulfonic acid and sulfate radicals of detergent sulfonic acid salts and detergent sulfate salts, and M is an alkali metal.

2. A novel compound:

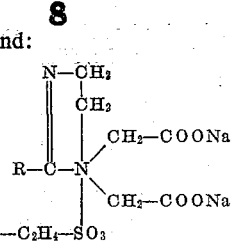

R—CONH—$C_2H_4$—$SO_3$ in which R is aliphatic hydrocarbon of 4–18 carbon atoms.

References Cited in the file of this patent

UNITED STATES PATENTS

| | | |
|---|---|---|
| 2,183,856 | Meyer | Dec. 19, 1939 |
| 2,206,249 | Daimler et al. | July 2, 1940 |
| 2,225,960 | Orthner et al. | Dec. 24, 1940 |
| 2,528,378 | Mannheimer | Oct. 31, 1950 |
| 2,619,467 | Isbell | Nov. 25, 1952 |